United States Patent
Qi et al.

(10) Patent No.: US 12,483,862 B2
(45) Date of Patent: Nov. 25, 2025

(54) MULTICAST AND BROADCAST SERVICE STATUS REPORTING

(71) Applicant: ZTE CORPORATION, Guangdong (CN)

(72) Inventors: Tao Qi, Guangdong (CN); Lin Chen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 400 days.

(21) Appl. No.: 18/105,657

(22) Filed: Feb. 3, 2023

(65) Prior Publication Data
US 2023/0179962 A1   Jun. 8, 2023

Related U.S. Application Data

(63) Continuation of application No. PCT/CN2020/107471, filed on Aug. 6, 2020.

(51) Int. Cl.
*H04W 24/10* (2009.01)
*H04W 4/06* (2009.01)

(52) U.S. Cl.
CPC .......... *H04W 4/06* (2013.01); *H04W 24/10* (2013.01)

(58) Field of Classification Search
CPC ....... H04W 4/06; H04W 24/10; H04W 76/40; H04W 80/02; H04L 2001/0093; H04L 1/0026; Y02D 30/70
See application file for complete search history.

(56) References Cited

U.S. PATENT DOCUMENTS

| | | | |
|---|---|---|---|
| 2008/0076359 A1 | 3/2008 | Charpentier et al. | |
| 2010/0226263 A1* | 9/2010 | Chun | H04L 1/0027 370/312 |
| 2013/0114446 A1* | 5/2013 | Liu | H04W 24/10 370/252 |
| 2014/0286222 A1 | 9/2014 | Yu et al. | |
| 2023/0354106 A1* | 11/2023 | Godin | H04W 76/22 |

(Continued)

FOREIGN PATENT DOCUMENTS

| | | |
|---|---|---|
| CN | 101883327 A | 11/2010 |
| CN | 102378109 | 3/2012 |
| CN | 102378113 | 3/2012 |

(Continued)

OTHER PUBLICATIONS

No Author Listed, "MBMS reception status report for service continuity," dated Au. 2011, 3 pages.

(Continued)

*Primary Examiner* — Chuong A Ngo
(74) *Attorney, Agent, or Firm* — Crowell & Moring LLP

(57) ABSTRACT

Methods, apparatus, and systems that enable reporting of reception status associated with a Multicast and Broadcast Service are provided. In one example aspect, a method for wireless communication includes receiving, by a communication device from the network node, configuration information that configures information indicating a reception status of a multicast and broadcast service. Data for the multicast and broadcast service is carried in one or more bearers. The method also includes transmitting, by the communication device, the information indicating the reception status to the network node based on a result the measurement.

20 Claims, 8 Drawing Sheets

(56) References Cited

U.S. PATENT DOCUMENTS

2025/0097274 A1* 3/2025 Belling ............... H04L 65/611

FOREIGN PATENT DOCUMENTS

| EP | 2 848 034 A0 | 3/2015 |
| EP | 3 092 730 A1 | 11/2016 |
| WO | WO 2013/167192 A1 | 11/2013 |
| WO | WO 2015/103947 A1 | 7/2015 |
| WO | WO 2020/077745 | 4/2020 |
| WO | WO 2020/077745 A1 | 4/2020 |

OTHER PUBLICATIONS

Office action in Korean application No. 10-2023-7004257, dated May 27, 2024, 13 pages (with English translation).
International Search Report issued Apr. 30, 2021 in (PCT) Application No. PCT/CN2020/107471.
Mediatek. "MBMS Reception Status Report for Service Continuity" *3GPP TSG-RAN2 #75 Meeting R2-114196*, Aug. 26, 2011 (Aug. 26, 2011). the whole document.
Office action issued in European application No. 20948406.2, dated Jan. 10, 2025, 5 pages.
Extended European Search Report issued Jul. 7, 2023 in corresponding European Patent Application No. 20948406.2.
Office action in European application No. 20 948 406.2, dated Jun. 19, 2024, 7 pages.
Chinese-language Office Action issued in Chinese Application No. 202080104319.2 dated Jun. 24, 2025, with English translation (20 pages).

* cited by examiner though only to
MULTICAST AND BROADCAST SERVICE STATUS REPORTING This application is a continuation application of PCT International Application No. PCT/CN2020/107471, filed with the China National Intellectual Property Administration, PRC on Aug. 6, 2020, which is herein incorporated by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable reporting of reception status associated with a Multicast and Broadcast Service.

In one example aspect, a method for wireless communication includes receiving, by a communication device from the network node, configuration information that configures information indicating a reception status of a multicast and broadcast service. Data for the multicast and broadcast service is carried in one or more bearers. The method also includes transmitting, by the communication device, the information indicating the reception status to the network node based on a result the measurement. The information indicating the reception status indicates a reception status of the multicast and broadcast service.

In another example aspect, a method for wireless communication includes transmitting, by a network node, configuration information to a communication device that configures information indicating a reception status of a multicast and broadcast service. Data for the multicast and broadcast service is carried in one or more bearers. The method also includes receiving, by the network node, the information indicating the reception status from the communication device based on a result the measurement. The information indicating the reception status indicates a reception status of the multicast and broadcast service.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
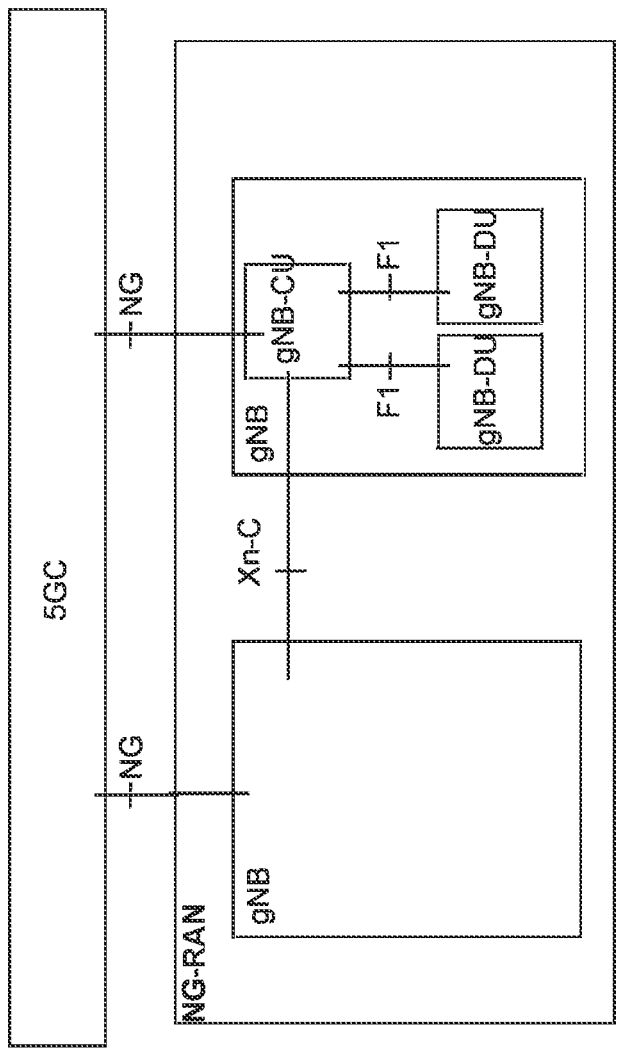
FIG. 1 illustrates an example Radio Access Network (RAN) node in Fifth-Generation (5G) communication systems.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The broadcast technology, named as Evolved Multimedia Broadcast Multicast Services (eMBMS) in Long Term Evaluation (LTE) communication systems, was designed for semi-static video programs. That is, the network delivers content to the User Equipment (UE) without getting UE's feedback to the network, either in the air interface or in the service layer. Due to the lack of feedback, the network cannot effectively change the broadcast region, or balance the occupied radio resources to improve delivery reliability.

For example, eMBMS relies on service-level switching to switch between unicast transmission and broadcast transmission. Certain content that is initially delivered over the unicast network can be turned into an MBMS user Service to efficiently use network resources when the traffic volume exceeds a certain threshold. Such dynamic conversion from unicast delivery to MBMS delivery is also referred to as "MBMS offloading." There are two types of MBMS offloading: UE-Elected and Network-Elected offloading. In both types, there may be a network proxy/server to detect whether unicast traffic volume for the same service or content exceeds a certain threshold, and to indicate such occurrence to the Broadcast Multicast Service Center (BMSC) to enable MBMS offloading. However, service-level switch is limited by a long service interruption time. Such limitations have hindered the wide usage of eMBMS in many scenarios. In certain services, such as the mission critical push to talk (MCPTT) service for public safety, long traffic interruptions are intolerable.

The first version of 5G multicast/broadcast systems introduces new services with diverse requirements, such as ad-hoc multicast/broadcast streams, transparent Internet Protocol version 4 (IPv4)/IPv6 multicast delivery, IPTV, software delivery over wireless, group communications and broadcast/multicast IoT applications, V2X applications, and/or public safety. Some of these services require higher reliability, thus there still exist the need for enabling the network to dynamically change transmission mode(s) or configuration(s) to as to support best effort delivery (e.g., to enable service continuity in mobility scenarios) and to provide power saving.

This patent document discloses techniques that can be implemented in various embodiments to enable the UE to report service reception status of an MBS, thereby allowing the network side to perform transmission mode changes efficiently (e.g., fast switching between unicast transmission mode and multicast transmission mode) so as to offer higher service reliability or radio resource efficiency. It is noted that the unicast transmission mode is also referred to as the Point-To-Point (PTP) transmission mode in which service data (e.g., MBS service data) is transmitted to a specific communication device (e.g., UE) from a network node (e.g., gNB) in PTP or unicast manner. The multicast transmission mode is also referred to as Point To Multipoint (PTM) transmission mode in which service data (e.g., MBS service data) is transmitted to one or more communication devices (e.g., UEs) from a network node (e.g., gNB) in PTM or multicast manner.

FIG. 1 illustrates an example Radio Access Network (RAN) node in 5G communication systems. In 5G New Radio (NR) technology, a RAN node can be divided into two logic units, Central Unit (CU) and Distributed Unit (DU). The gNB Central Unit (gNB-CU) is a logical node that hosts Radio Resource Configuration (RRC), Service Data Adaptation Protocol (SDAP) and Packet Data Convergent Protocol (PDCP). The gNB-CU also controls the operation of one or more gNB Distributed Units (gNB-DUs), The gNB-CU terminates the F1 interface connected with the gNB-DU. The gNB-DU is a logical node that hosts Radio Link Control (RLC), Medium Access Control (MAC) and Physical (PHY) layers of the node. Its operations can be partly controlled by a corresponding gNB-CU. One gNB-DU can support one or multiple cells. The gNB-DU terminates the F1 interface connected with the gNB-CU. The CU node and the DU node of a gNB can be deployed separately or together.

Figure 2:
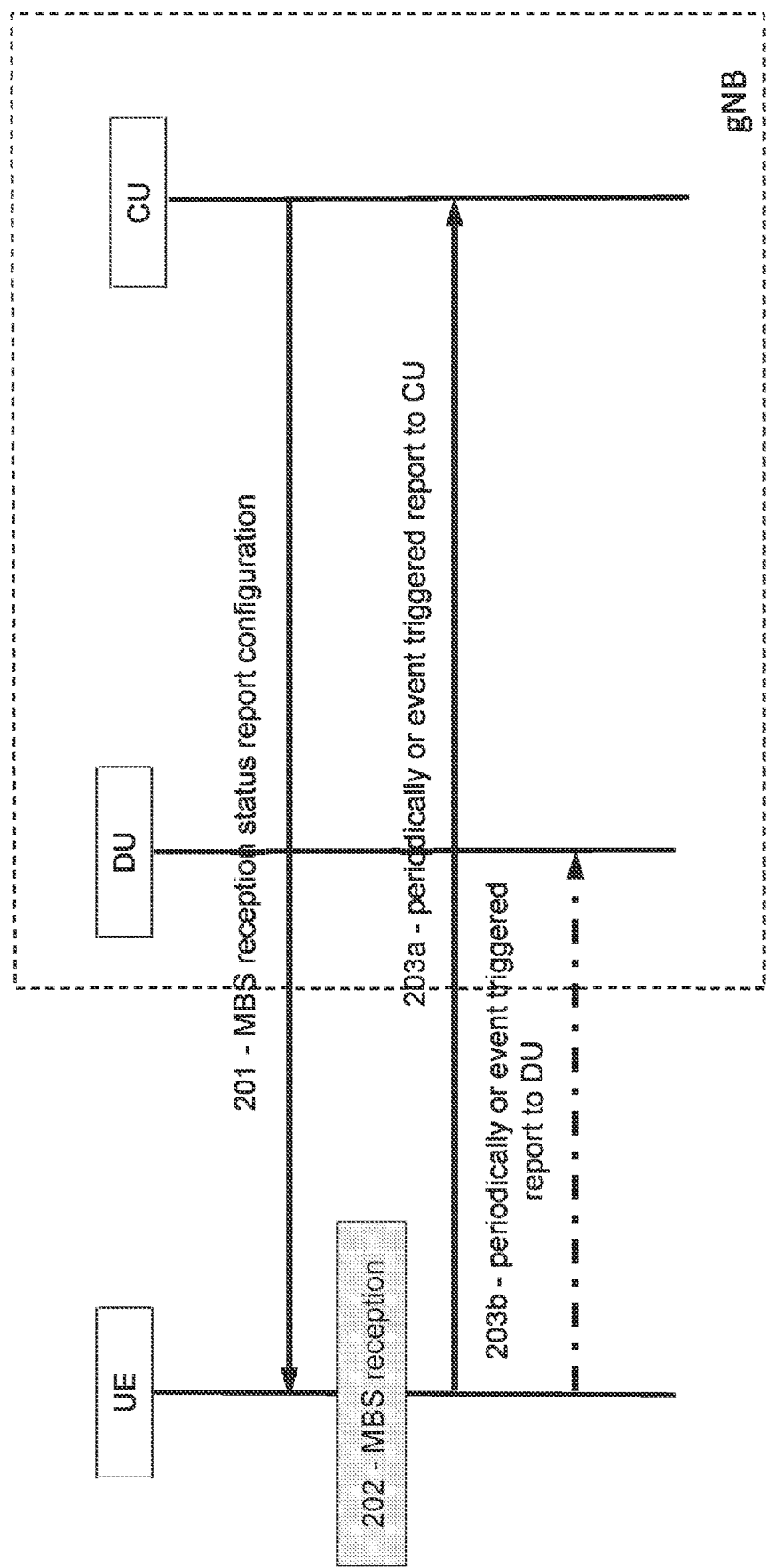
FIG. 2 illustrates an example signaling sequence for a communication device to provide feedback about a Multicast and Broadcast Service (MBS) in accordance with the present technology.

FIG. 2 illustrates an example signaling sequence 200 for a communication device to provide the reception status report about an MBS in accordance with the present technology. Some example operations are described below:

Operation 201: The network node (e.g., the CU node of the gNB) transmits configuration information to the UE to configure the UE to report reception status about MBS service reception status to the network node. The MBS reception status report from the UE can enable the network node to decide how to efficiently deliver the MBS data and/or to improve the delivery reliability of the MBS. For example, the network node can tune the physical layer parameters like modulation and code scheme (MCS) or execute delivery mode switching (e.g., from PMP to P2P) to achieve the reliability/efficiency that is needed.

Operation 202: The UE performs MBS reception and measurements to collect metrics or statistics regarding the MBS service reception status.

Operation 203a: The UE can transmit the MBS reception status report to the CU node periodically. Alternatively, or in addition, the UE can be triggered by the network or defined events to transmit the MBS reception status report (that is, the reception status report is aperiodic).

Operation 203b: The UE can also transmit the MBS reception status report to the DU node (either periodically or in an aperiodic manner) if the MBS reception status report is transmitted at the MAC/PHYS layers.

In some embodiments, an additional operation following Operation 203a or 203b can be performed by the network node to transmit new or additional configuration information to configure the new transmission mode or update the current transmission configurations.

In some embodiments, the configuration information transmitted in Operation 201 indicates how the UE should measure and report the MBS reception status. For example, the configuration information can figure the content of the MBS reception status report (e.g., what metrics and/or statistics need to be included in the report) and how the MBS reception status report should be transmitted by the UE (e.g., via RRC signaling message, MAC CE, or uplink control information). As another example, the configuration information can indicate a triggering condition for triggering the UE to transmit the MBS reception status report. In some embodiments, the configuration information includes one or more thresholds associated with the metrics and/or statistics to be measured for the MBS. When the measured metrics and/or statistics reach, exceed, or fall below the corresponding threshold(s), the UE can report the reception status, or a mode switching request included in the MBS reception status report to request the network node to switch from one transmission mode (e.g., PTM) to a different mode (e.g., PTP). In some embodiments, the configuration information can include reception configurations for the communication mode(s), such as the bearer configuration and or radio resource configuration information. The configuration information can be carried in a single message or multiple separate messages.

In some embodiments, the configuration information indicates an enabling information of the reception status report. The enabling information can further include enabling or disabling information. If enabled, the UE transmits the MBS reception status report based on the above configuration. If disabled, the UE does not transmit the MBS reception status report.

The Content of the MBS Reception Status Report

In order to determine the reception status of an MBS, the UE can measure metrics and/or statistics at different protocol layers. In some embodiments, the UE can report the status or relevant metrics at the Packet Data Convergence Protocol (PDCP) layer. For example, the UE can generate a PDCP status report that complies to the Third-Generation Partnership Project (3GPP) standard. In some embodiments, the UE can report a packet loss rate at the PDCP layer to the network node. For example, the UE can determine the packet loss rate as follows:

1.1. A packet loss rate can be defined as, in a time window T, the ratio between the number of lost packets and the total number of received packets. One packet corresponds to one PDCP Service Data Unit (SDU) or PDCP Protocol Data Unit (PDU). The total number of received PDCP packets can be defined as, during the time window T, the gap between the highest received PDCP packet Serial Number (SN) and the lowest received PDCP packet SN. The number of lost PDCP packets can be defined as, during the time window T, the number of PDCP packet that are lost between the highest PDCP packet SN and the lowest PDCP packet SN. The time window T can be a configured time duration.

1.2. A packet can belong to one specific radio bearer, a subset of the radio bearers of one specific MBS session, all the radio bearers of one specific MBS session, or all the radio bearers of all the MBS session that the UE is associated with. Therefore, the packet loss rate can be defined with different granularities, such as per radio bearer, per MBS, or per UE. In some embodiments, based on the granularity, the packet loss rate can be associated with an identifier (ID) of radio bearer and/or an MBS identifier (ID).

1.3. The ratio can be further quantified into an integer (e.g., by multiplying with a number and taking a floor or ceiling operation).

In some embodiments, the UE can report the status or relevant metrics at the MAC layer. For example, the UE can determine an error rate at the MAC layer associated with the MBS as follows:

2.1 The error rate can be a Block Error Rate (BLER). The BLER can be computed, over a measurement period, as the ratio between the number of received transport blocks resulting in Cyclic Redundancy Check (CRC) errors and the total number of received transport blocks of a specific MBS or MBS session. In some embodiments, the calculation can be performed for all the related Hybrid Automatic Repeat Request (HARQ) processes that are associated with the MBS service. The measurement period can be a configured time duration.

2.2 The error rate can be a rate that is computed based on the number of errors of downlink initial transport blocks over the total number of downlink initial transport blocks.

2.3 The error rate can have a granularity associated with an MCS. For example, the error rate only takes into account of the transport blocks that use the same MCS. As another example, the error rate has a granularity of the MBS to account for all MCSs associated with the MBS.

2.4 The error rate can be further quantified into an integer (e.g., by multiplying with a number and taking a floor or ceiling operation).

In some embodiments, the UE can report the status or relevant metrics at the Physical (PHY) layer. In some embodiments, the UE can determine the Channel State Information Reference Signal Received Power (CSI-RSRP) and/or CSI Reference Signal Received Quality (CSI-RSRQ) associated with the MBS within a measurement period using the CSI-RS resources associated with the MBS or the MBS ID. The measurement period can be a configured time duration. The measured results can be further quantified into an integer (e.g., by multiplying with a number and taking a floor or ceiling operation).

A mode switching request can be included in the MBS reception status report or replace the MBS reception status report.

The Triggering Condition for the MBS Reception Status Report or Mode Switching Request When the UE should transmit the MBS reception status report can be configured (e.g., by the configuration information) or be predefined.

In some embodiments, the MBS reception status report is transmitted periodically according to a period T. In some embodiments, the period T is configured by the configuration information from the network node. In some embodiments, the configuration information further includes information that can enable or disable the periodic transmission of the MBS reception status report. In some embodiments, the MBS reception status report is transmitted periodically after certain condition is satisfied, the condition can be a value of one of the following: 1) packet loss rate at a Packet Data Convergence Protocol (PDCP) layer; 2) Block Error Rate (BLER) at a Medium Access Control (MAC) layer, 3) CSI-RSRP or CSR-RSRQ in physical layer. The condition and the threshold value can be included in the configuration information.

In some embodiments, the MBS reception status report or mode switching request is triggered by one or more events. In some embodiments, a triggering event is indicated by one or more thresholds associated with the metrics and/or statistics to be measured for the MBS. The one or more thresholds can be predefined or be included in the configuration information from the network node. When the measured metrics and/or statistics reach, exceed, or fall below the corresponding threshold(s), the UE can send the MBS reception status report or mode switching request to the network node. For example, the configuration information can include a threshold for the packet loss rate in the PDCP layer or the BLER value in the MAC layer. If the measured values fall below the threshold, the MBS reception status report is triggered. In some embodiments, a mode switching request to request the network node to switch from one transmission mode (e.g., PTM) to a different mode (e.g., PTP).

In some embodiments, one or more events at the PDCP layer can be defined or configured. For example, for one specific data bearer of one specific MBS, if reordering timer is enabled, UE is triggered to send the MBS reception status report for this specific data bearer of one specific MBS upon the expiration of the timer.

In some embodiments, the network node can send a signaling to trigger the transmission of the MBS reception status report. For example, the network can transmit a signaling over the broadcast control channel to indicate that, for one specific MBS, the UE is triggered to send the MBS reception status report. As another example, the signaling can be MAC CE which is multiplexed with the MBS data or user service data for one specific UE. The network can transmit a MAC control element (CE) with a specific logic channel ID to indicate that, for the corresponding MBS associated with the MBS data, the UE is triggered to send the MBS reception status report (e.g., per MAC CE). As yet another example, the signaling message can be a Downlink Control Information (DCI) message on the PHY layer associated with the MBS transport block. The DCI message can indicate that, for the corresponding MBS associated with the DCI, the UE is triggered to send the MBS reception status report.

The UE can transmit the MBS reception status report or mode switching request in an RRC signaling message, a MAC CE, or a PHY layer signaling message (e.g., an uplink control information message). As discussed above, the MBS reception status report or mode switching request can have different granularity levels (e.g., per radio bearer, per MBS, or per UE). In some embodiments, the MBS reception status report or mode switching request is associated with a corresponding radio bearer and/or an MBS ID.

Figure 3:
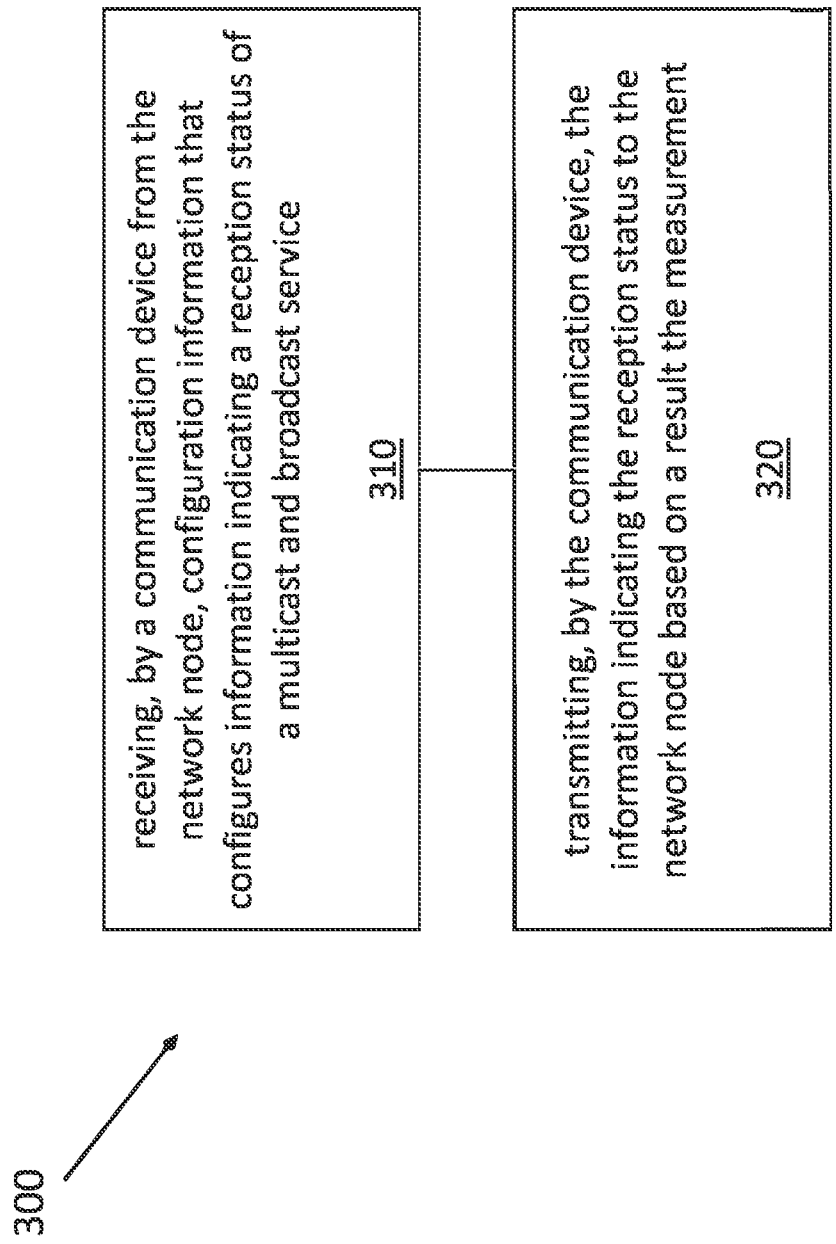
FIG. 3 is a flowchart representation of a method for wireless communication in accordance with the present technology.

FIG. 3 is a flowchart representation of a method 300 for wireless communication in accordance with the present technology. The method 300 includes, at operation 310, receiving, by a communication device from the network node, configuration information that configures information indicating a reception status of a multicast and broadcast service. Data for the multicast and broadcast service is carried in one or more radio bearers. The method 300 includes, at operation 320, transmitting, by the communication device, the information indicating the reception status to the network node based on a result the measurement.

In some embodiments, the configuration information comprises enabling information indicating whether transmitting of the information indicating the reception status is enabled or disabled. In some embodiments, the configuration information comprises information that triggers the transmitting of the information indicating the reception status. In some embodiments, the configuration information comprises a periodicity at which the transmitting of the information indicating the reception status is triggered. In some embodiments, the configuration information comprises information that enables or disables periodically triggering of the transmitting of the information indicating the reception status. In some embodiments, the configuration information comprises information about an event that triggers the transmitting of the information indicating the reception status. In some embodiments, the event is indicated by one or more thresholds associated with the multicast and broadcast service or a radio bearer associated with the multicast and broadcast service, and wherein the threshold comprises one of: 1) a packet loss rate at a Packet Data Convergence Protocol (PDCP) layer; 2) a Block Error Rate (BLER) at a Medium Access Control (MAC) layer, 3) Channel State Information Reference Signal Received Power (CSI-RSRP) in a physical layer, or (4) Channel State Information Reference Signal Received Quality (CSI-RSRQ) in the physical layer.

In some embodiments, the information indicating the reception status comprises a Packet Data Convergence Protocol (PDCP) status report. In some embodiments, the information indicating the reception status comprises a packet loss rate at a Packet Data Convergence Protocol (PDCP) layer. In some embodiments, the information indicating the reception status comprises a Block Error Rate (BLER) in a Medium Access Control (MAC) layer, a CSI-RSRP in a physical layer, or a CSR-RSRQ in the physical layer. In some embodiments, the information indicating the reception status is transmitted to the network node using a Radio Resource Control (RRC) signaling message, a Medium Access Control (MAC) Control Element (CE), or a physical layer signaling message.

In some embodiments, each of the one or more radio bearers is associated with a transmission mode. The information indicating the reception status comprises a mode switching request that requests to switch from a first transmission mode to a second transmission mode for at least one radio bearer that carries the data for the multicast and broadcast service. In some embodiments, the information indicating the reception status that comprises the mode switching request is of a granularity corresponding to at least one of: (1) each of the one or more radio bearers of the multicast and broadcast service, (2) the multicast and broadcast service, or (3) the communication device. In some embodiments, the method includes receiving, by the communication device, mode switching response information from the network node in response to the mode switching request from the communication device. The mode switching response information is optionally associated with at least one of: (1) an identifier for a radio bearer, (2) an identifier for the multicast and broadcast service.

In some embodiments, the transmission mode comprises a point-to-point transmission mode or a point-to-multipoint transmission mode. In some embodiments, the network node comprises a central unit (CU) and a distributed unit (DU).

Figure 4:
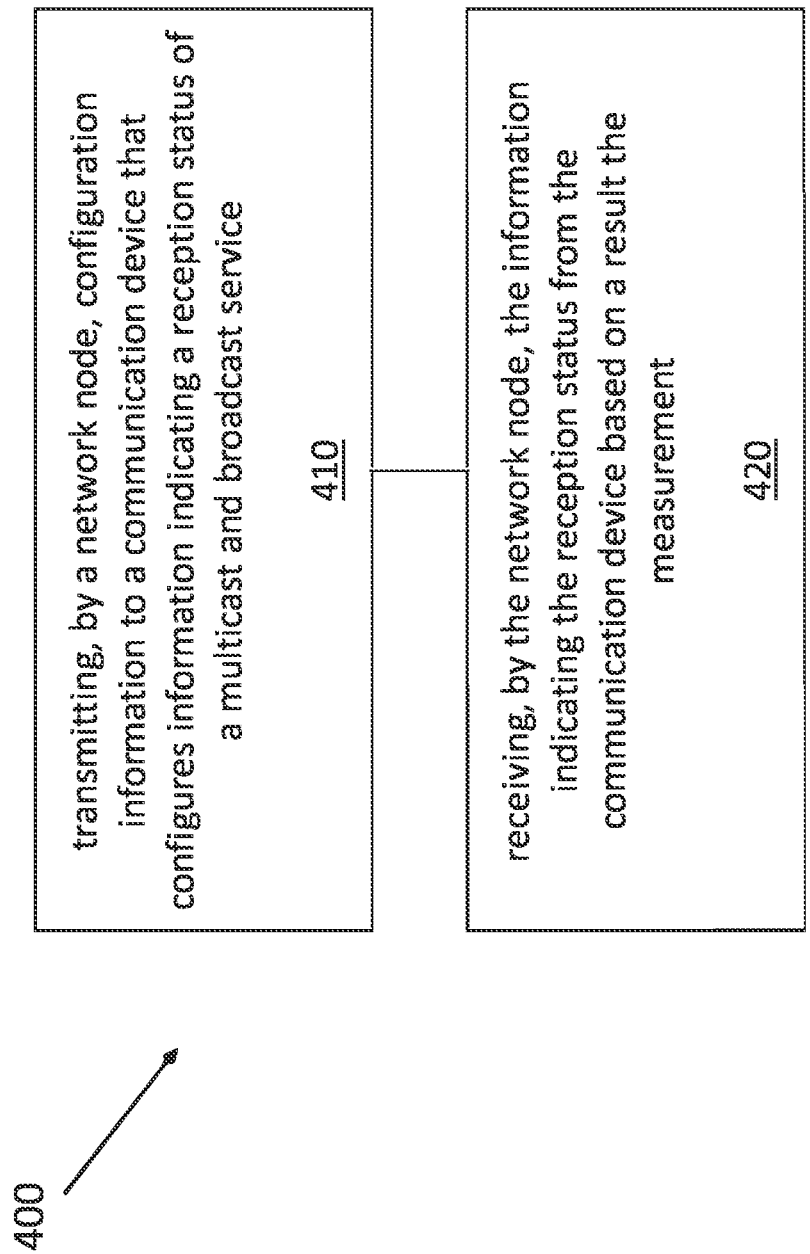
FIG. 4 is a flowchart representation of a method for wireless communication in accordance with the present technology.

FIG. 4 is a flowchart representation of a method 400 for wireless communication in accordance with the present technology. The method 400 includes, at operation 410, transmitting, by a network node, configuration information to a communication device that configures information indicating a reception status of a multicast and broadcast service. Data for the multicast and broadcast service is carried in one or more bearers. The method 400 also includes, at operation 420, receiving, by the network node, the information indicating the reception status from the communication device based on a result the measurement.

In some embodiments, the configuration information comprises an enabling information indicating whether transmitting of the information indicating the reception status is enabled or disabled. In some embodiments, the configuration information comprises information that triggers a transmission of the information indicating the reception status. In some embodiments, the configuration information comprises a periodicity at which the transmission of the information indicating the reception status is triggered. In some embodiments, the configuration information comprises information that enables or disables periodically triggering of the transmission of the information indicating the reception status. In some embodiments, the configuration information comprises information about an event that triggers the transmission of the information indicating the reception status. In some embodiments, the event is indicated by (1) one or more thresholds associated with the multi cast and broadcast service or a radio bearer associated with the multicast and broadcast service, and wherein the threshold comprises one of: 1) a packet loss rate at a Packet Data. Convergence Protocol (PDCP) layer; 2) a Block Error Rate (BLER) at a Medium Access Control (MAC) layer, 3) Channel State Information Reference Signal Received Power (CSI-RSRP) in a physical layer, or (4) Channel State Information Reference Signal Received Quality (CSI-RSRQ) in the physical layer.

In some embodiments, the information indicating the reception status comprises a Packet Data Convergence Protocol (PDCP) status report. In some embodiments, the information indicating the reception status comprises a packet loss rate at a Packet Data Convergence Protocol (PDCP) layer. In some embodiments, the information indicating the reception status comprises a Block Error Rate (BLER) in a Medium Access Control (MAC) layer, a CSI-RSRP in a physical layer, or a CSR-RSRQ in the physical layer. In some embodiments, the information indicating the reception status is carried in a Radio Resource Control (RRC) signaling message, a Medium Access Control (MAC) Control Element (CE), or a physical layer signaling message.

In some embodiments, each of the one or more radio bearers is associated with a transmission mode. The information indicating the reception status comprises a mode switching request that requests to switch from a first transmission mode to a second transmission mode for at least one radio bearer that carries the data for the multicast and broadcast service. In some embodiments, the information indicating the reception status that comprises the mode switching request is of a granularity corresponding to at least one of: (1) each of the one or more radio bearers of the multicast and broadcast service, (2) the multicast and broadcast service, or (3) the communication device. In some embodiments, the method includes transmitting, by the network node, mode switching response information to the communication device in response to the mode switching request. The mode switching response information is associated with at least one of: (1) an identifier for a radio bearer, (2) an identifier for the multicast and broadcast service.

In some embodiments, the transmission mode comprises a point-to-point transmission mode or a point-to-multipoint transmission mode. In some embodiments, the network node comprises a central unit (CU) and a distributed unit (DU).

Some examples of the disclosed techniques are further described in the following example embodiments.

Embodiment 1

Figure 5:
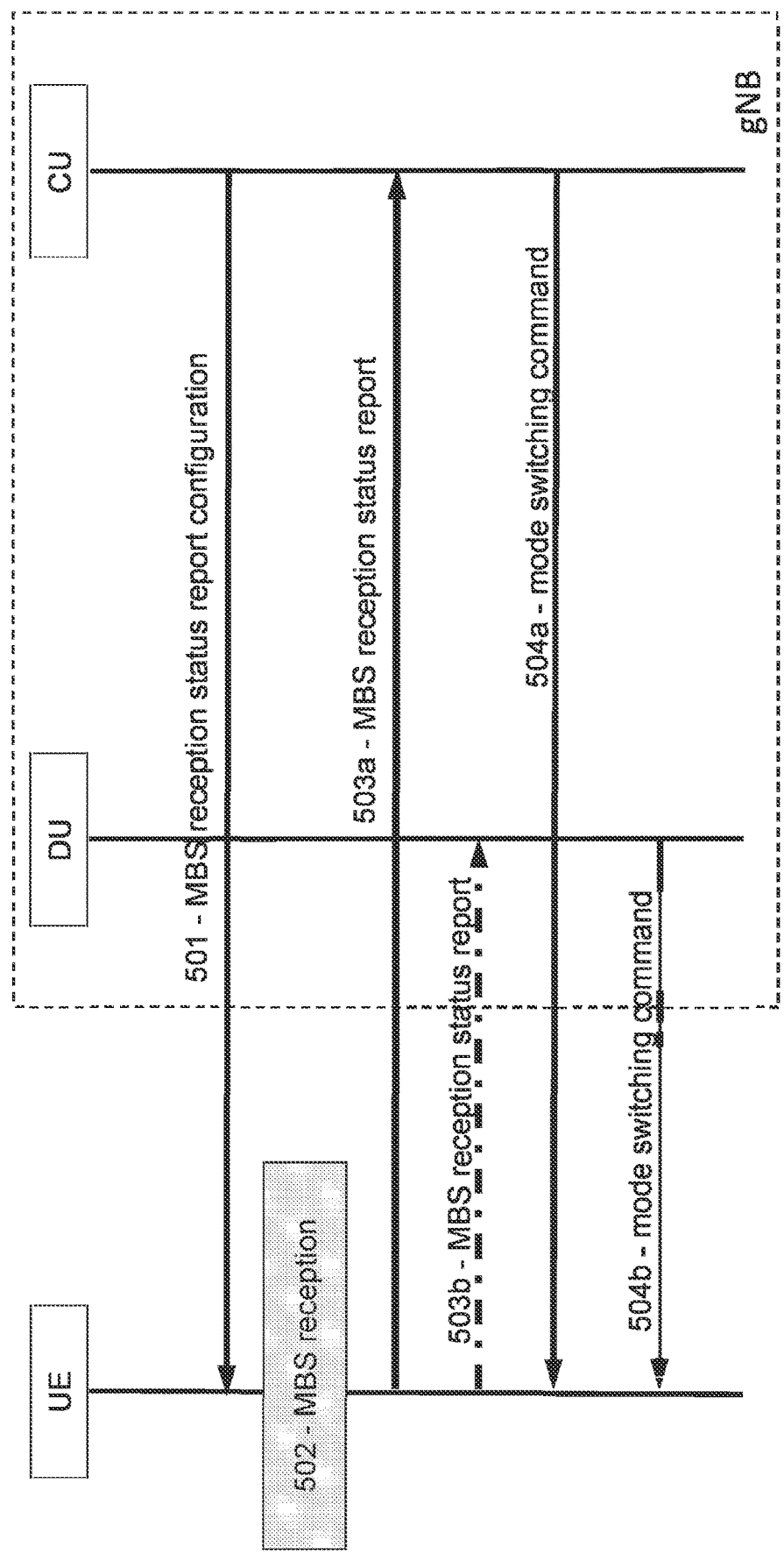
FIG. 5 illustrates an example signaling sequence for a transmission mode switch in accordance with the present technology.

FIG. 5 illustrates an example signaling sequence 500 for a transmission mode switch in accordance with the present technology. Example operations are described below:

Operation 501: The network node (e.g., the CU node of the gNB) transmits configuration of MBS reception status report to the UE to configure the UE to report MBS reception status report to the network node, and optionally the bearer configuration associated with the MBS.

Operation 502: The UE performs MBS reception and measurements to collect metrics or statistics regarding the MBS service reception status.

Operation 503a: Based on the measurement results and one or more thresholds (e.g., included in the configuration information) or a periodical timer, the UE transmits MBS reception status report to the CU node of the gNB. The UE can use an RRC signaling message to carry the request.

Operation 503b: Alternatively, the UE can transmit MBS reception status report to the DU node of the gNB. The UE can use a MAC CE or an uplink control information (UCI) signaling to carry the report. The UE can also use other message formats on the Physical Uplink Control Channel (PUCCH) and/or the Physical Uplink Shared Channel (PUSCH).

Operation 504a: The CU node of the gNB sends a mode switching command information to the UE (e.g., via an RRC signaling message). The mode switching command information can include the bearer configuration of the target transmission mode associated with the MBS.

Operation 504b: Alternatively, the DU node of the gNB can send a mode switching command information to the UE (e.g., via a MAC CE or a DCI signaling message).

In this example, the UE can be configured with a triggering condition such that the UE transmits the MBS reception status report when the triggering condition is satisfied.

In some embodiments, the configuration information indicates an enabling information of the information indicating the reception status. The enabling information can further include enabling or disabling information. If enabled, the UE transmits the MBS reception status report based on the above configuration. If disabled, the UE does not transmit the MBS reception status report.

The MBS reception status report can be PDCP Status report per radio bearer associated with the concerned MBS. In another example, the MBS reception status report can be packet loss rate in PDCP layer for specific radio bearer associated with the MBS.

The MBS reception status report can have different granularities. For example, a per-radio-bearer MBS reception status report can be transmitted on a particular radio bearer of the MBS. The request can include information such as the radio bearer ID and/or MBS to identify the bearer of the MBS. As another example, a per-MBS MBS reception status report can be transmitted on all bearers of the MBS. The MBS reception status report can include information such as the MBS ID to identify the MBS. As yet another example, a per-UE MBS reception status report can be transmitted on all MBSs of the UE. The MBS reception status report can include information such as a UE ID.

The mode switching command information from the network (either CU or DU) can include at least one of the corresponding radio bearer ID, MBS ID, and/or UE ID. In some embodiments, the mode switching command information is per radio bearer, or per MBS.

After receiving the mode switching command information from the network node to indicate a switch from an initial transmission mode to a target transmission mode, the UE can apply the target transmission mode configurations if the target transmission mode has been pre-configured and start to receive the MBS data using the target transmission mode.

Embodiment 2

Figure 6:
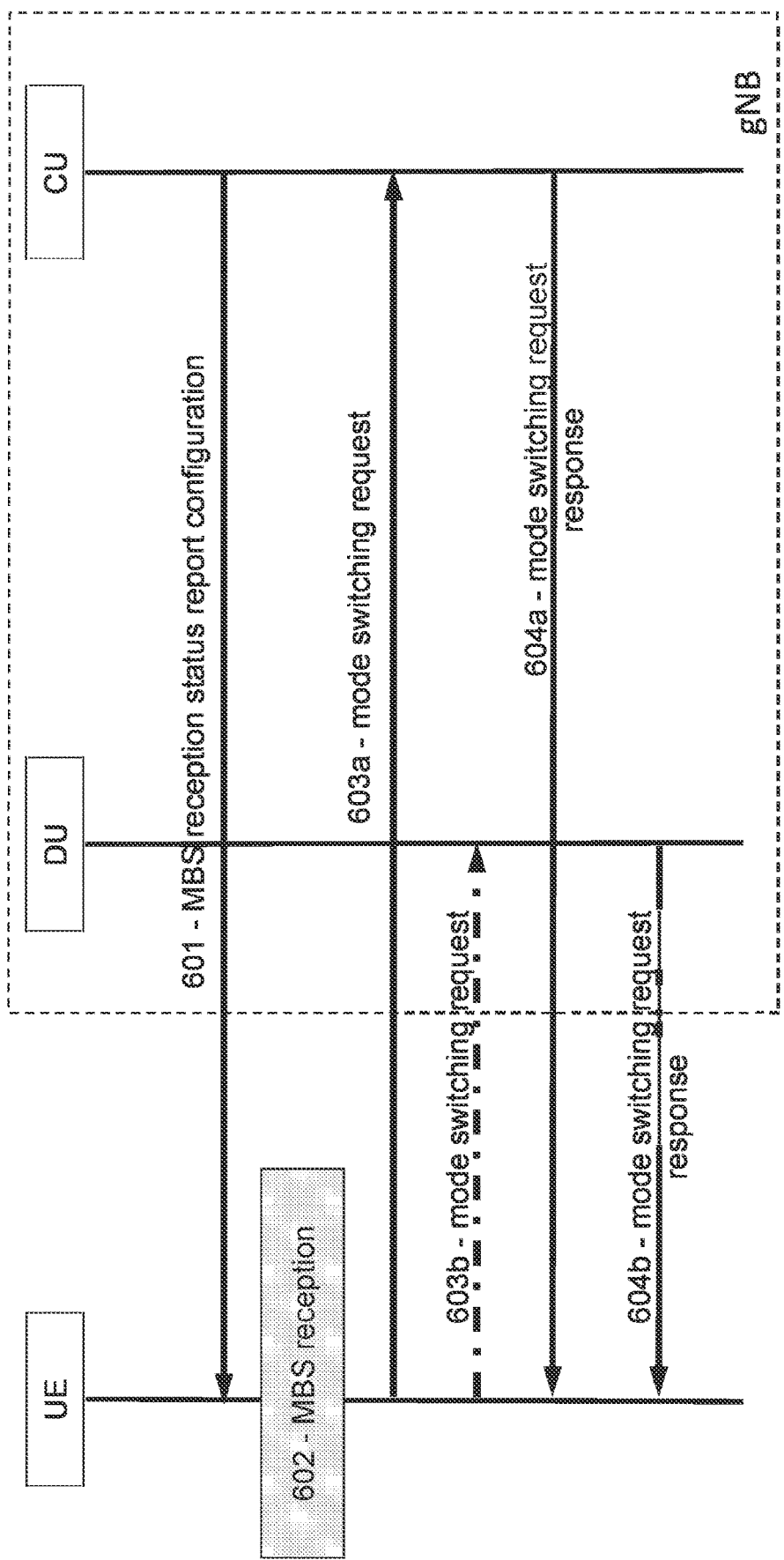
FIG. 6 illustrates another example signaling sequence for a transmission mode switch in accordance with the present technology.

FIG. 6 illustrates an example signaling sequence 600 for a transmission mode switch in accordance with the present technology. Example operations are described below:

Operation 601: The network node (e.g., the CU node of the gNB) transmits configuration information to the UE to configure the measurement UE performs to reflect the MBS reception status, and the condition for UE to transmit mode switching request to the network node, and optionally the bearer configuration associated with the MBS.

Operation 602: The UE performs MBS reception and measurements to collect metrics or statistics regarding the MBS service reception status.

Operation 603a: Based on the measurement results and one or more thresholds (e.g., included in the configuration information), the UE transmits a mode switching request to the CU node of the gNB. The UE can use an RRC signaling message to carry the request.

Operation 603b: Alternatively, the UE can transmit a mode switching request to the DU node of the gNB. The UE can use a MAC CE or an uplink control information (UCI) signaling to carry the request. The UE can also use other message formats on the Physical Uplink Control Channel (PUCCH) and/or the Physical Uplink Shared Channel (PUSCH).

Operation 604a: The CU node of the gNB sends mode switching response information to the UE to acknowledge the receipt of the request (e.g., via an RRC signaling message)

Operation 604b: Alternatively, the DU node of the gNB can send mode switching response information to the UE to acknowledge the receipt of the request (e.g., via a MAC CE or a DCI signaling message).

In this example, the UE can be configured with a triggering condition such that the UE transmits the request when the triggering condition is satisfied.

In some embodiments, the configuration information indicates an enabling information of the mode switching request. The enabling information can further include enabling or disabling information. If enabled, the UE transmits the mode switching request based on the above configuration, e.g., when the condition is satisfied. If disabled, the UE does not transmit the mode switching request.

The request can have different granularities. For example, a per-radio-bearer mode switching request can be transmitted to request a mode switching on a particular radio bearer of the MBS. The request can include information such as the radio bearer ID and/or MBS to identify the bearer of the MBS. As another example, a per-MBS request can be transmitted to request a mode switching on all bearers of the MBS. The request can include information such as the MBS ID to identify the MBS, As yet another example, a per-UE request can be transmitted to request a mode switching on all MBSs of the UE. The request can include information such as a UE ID.

The mode switching response information from the network (either CU or DU) can include at least one of the corresponding radio bearer ID, MBS ID, and/or UE ID. In some embodiments, the mode switching response information can include the information of ACK/NACK to the mode switching request.

After receiving the mode switching response information from the network node to confirm a switch from an initial transmission mode to a target transmission mode, the UE can apply appropriate configurations if the target transmission mode has been pre-configured or included in the mode switching response information and start to receive the MBS data using the target transmission mode.

In some embodiments, the UE can suspend the MBS data reception by the initial transmission mode. For example, UE does not release the configuration of the initial transmission mode but stores the configuration.

Embodiment 3

In some embodiments, the UE receives configuration information for two radio bearers (RBs). One RB is associated with a first transmission mode of PTP type, and the other RB is associated with a second transmission mode of PTM type. The configuration information can include at least one Quality of Service (QoS) flow that belongs to the MBS session. The QoS can be mapped to the two radio bearers respectively. Each of the radio bearers is further associated with a PDCP configuration and an RLC bearer configuration. The above RB might be further associated with the MBS session ID, service ID, an ID that can uniquely identify the MBS session in between UE and RAN, or the combination of the above.

Alternatively, the UE can be configured with RBs that are associated with two types of RLC bearers. One RLC bearer is of the PTP type, and the other RLC hearer is of the PTM type bearer. The configuration information can include at least one QoS flow that belongs to the MBS session and is mapped to one radio bearer. The radio bearer is further associated with one PDCP configuration, and two RLC bearer configurations. One of the RLC bearer corresponds to the MBS service data reception in PTP mode, while the other in PTM mode.

The UE can be further configured with the radio resources for the transmission mode (e.g., PTM), which can include the cell information and the resource allocation information that are associated with the transmission. In some embodiments, the UE can receive configuration information regarding mode switching condition.

If the mode switching condition is satisfied (e.g., the reception condition of the MBS is worse than the defined threshold), the UE can send out a mode switching request (e.g., Operation 503a or 503b as shown in FIG. 5). The mode switching request can include one or more associated RB IDs, one or more MBS session IDs, a combination thereof. In some implementations, the mode switching request only indicates that a mode switching is needed without specifying the RB or MBS information.

In some embodiments, the mode switching request indicates that mode switch is needed. In some embodiments, the mode switching request indicates that mode switch for a specific RB (characterized by RB ID), or specific MBS session (characterized by MBS ID) is needed.

In some embodiments, the mode switching request can further indicate a mode switching profile. The profile can include at least one of the following:
  a. from PTP to PTM mode,
  b. from PTM to PTP mode,
  c. from PTP to PTM together with PTP mode,
  d. from PTM to PTM together with PTP mode,
  e. from PTM together with PTP to PTP mode, or
  f. from PTM together with PTP to PTM mode.

In some embodiments, the network node can refuse the mode switching request. The network node provides a cause value indicating why the request was denied.

In some embodiments, the network node can send mode switching response information to UE to confirm the mode switching request and respond to the UE with an acknowledgement. The acknowledgment can be associated with one or more RB IDs, one or more MBS IDs, or a combination thereof. In some embodiments, the network can include the target delivery mode configuration (e.g., RB configuration of PTM or PTP type), the resource allocation information (e.g., cell information, time and frequency domain information) associated with the MBS session, or both. The mode switching response information or mode switch request information may be carried in an RRC signaling, or MAC CE, or Layer 1/PHY signaling.

In some embodiments, configuration information for the initial transmission mode associated with the MBS is not released. The UE stores the configuration information for the initial transmission mode and then suspend or inactivate it. The UE then applies the target transmission mode configurations (e.g., the corresponding RLC bearer or RB configuration). If the target transmission mode is of PTM type, the UE can monitor the MBS service data transmission in the physical layer, e.g., monitoring the PDCCH characterized by MBS specific Radio Network Temporary Identifier (RNTI).

In some embodiments, the CU node and the DU node of the gNB are deployed separately. When the mode switching request is a lower layer signaling (e.g., MAC CE or layer 1/PHY signaling), the DU node can send a notification to the CU node to include the transmission mode for the concerned UE and the UE ID (e.g. gNB-DU UE F1AP ID or gNB-CU UE F1AP ID).

Figure 7:
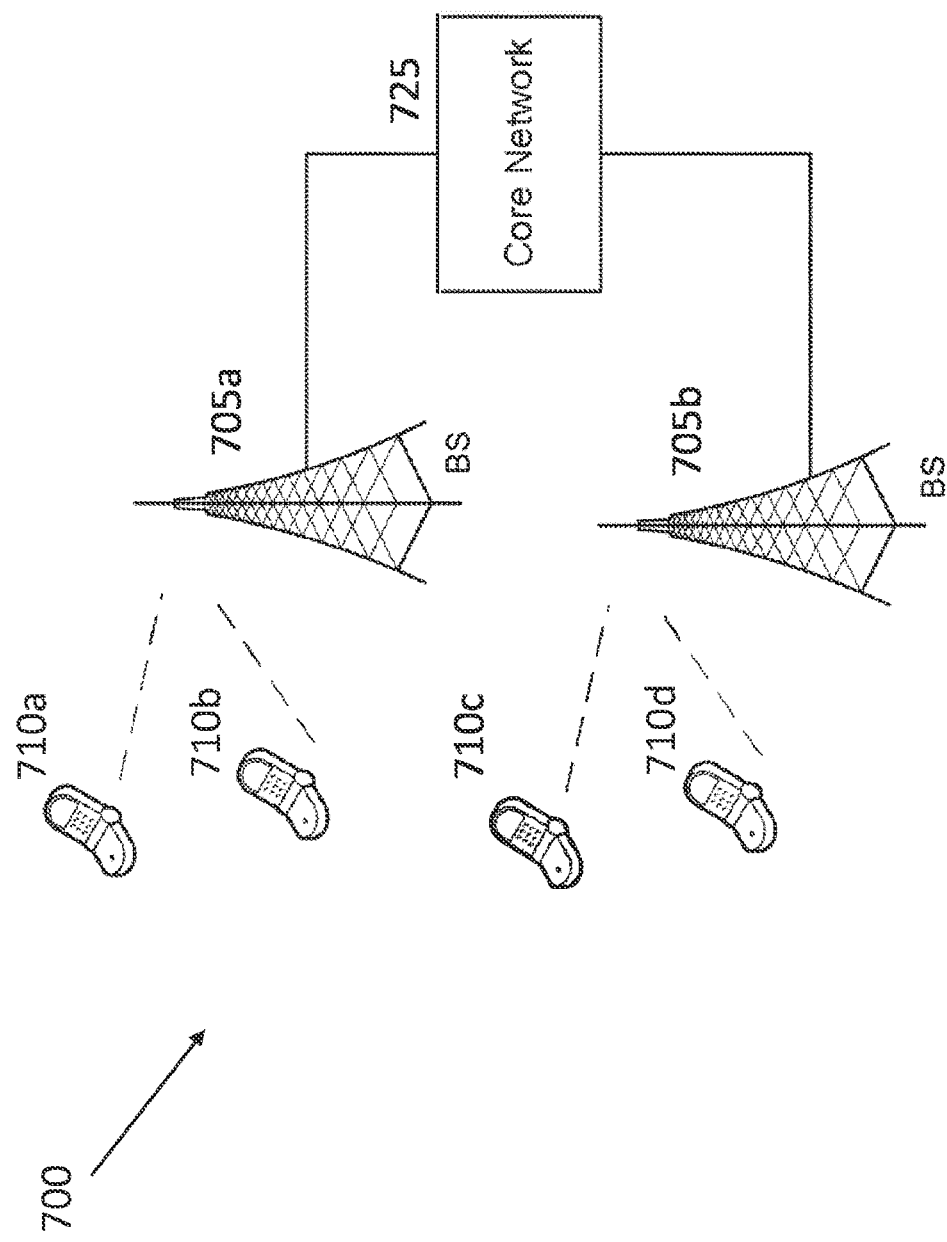
FIG. 7 shows an example of a wireless communication system where techniques in accordance with one or more embodiments of the present technology can be applied.

FIG. 7 shows an example of a wireless communication system 700 where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. The techniques and embodiments described in the present document may be implemented by the base stations of wireless devices described in the present document.

Figure 8:
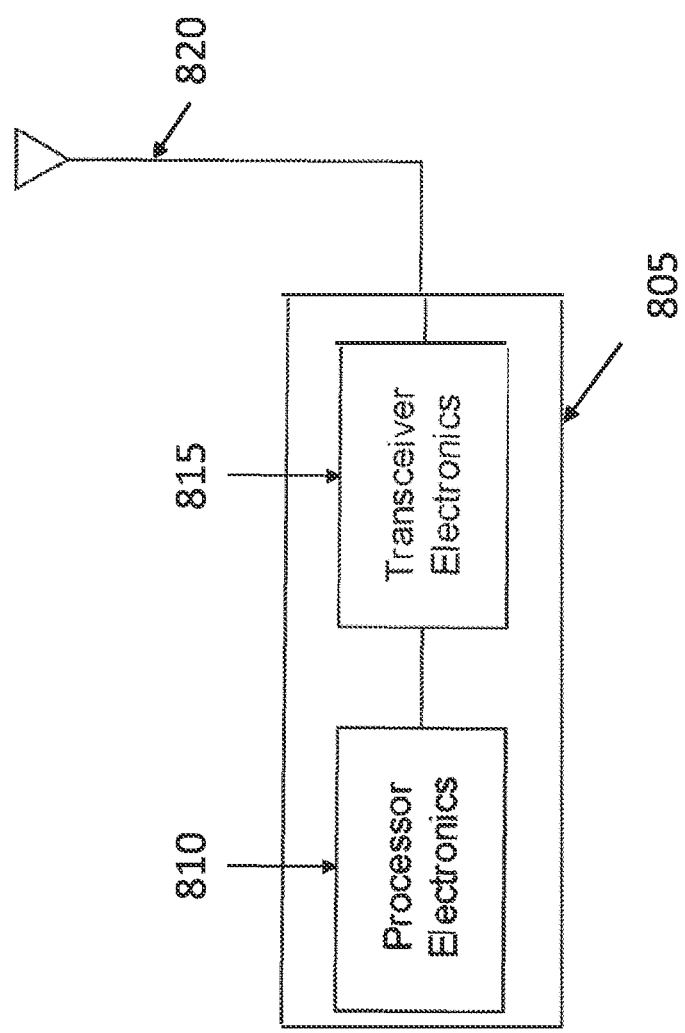
FIG. 8 is a block diagram representation of a portion of a radio station in accordance with one or more embodiments of the present technology can be applied.

FIG. 8 is a block diagram representation of a portion of a radio station in accordance with one or more embodiments of the present technology can be applied. A radio station 805 such as a base station or a wireless device (or wireless device) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein.

It will be appreciated that the present document discloses techniques that can be embodied in various embodiments to enable communication devices (e.g., UEs) to report service reception status of the associated MBS sessions, thereby allowing the network side to perform transmission mode changes directly to offer higher service reliability. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for wireless communication, comprising:
receiving, by a communication device from a network node, configuration information that configures information indicating a reception status of a multicast and broadcast service, wherein data for the multicast and broadcast service is carried in one or more radio bearers;
performing, by the communication device, measurement on the reception status based on the configuration information; and
transmitting, by the communication device, the information indicating the reception status to the network node based on a result of the measurement to trigger a transmission mode switching from a first transmission mode to a second transmission mode different than the first transmission mode for at least one radio bearer that carries the data for the multicast and broadcast service.

2. The method of claim 1, wherein the configuration information comprises enabling information indicating whether transmitting of the information indicating the reception status is enabled or disabled.

3. The method of claim 1, wherein the configuration information comprises information that triggers the transmitting of the information indicating the reception status.

4. The method of claim 3, wherein the configuration information comprises a periodicity at which the transmitting of the information indicating the reception status is triggered.

5. The method of claim 4, wherein the configuration information comprises information that enables or disables periodically triggering of the transmitting of the information indicating the reception status.

6. The method of claim 3, wherein the configuration information comprises information about an event that triggers the transmitting of the information indicating the reception status.

7. The method of claim 6, wherein the event is indicated by one or more thresholds associated with the multicast and broadcast service or a radio bearer associated with the multicast and broadcast service, and wherein the threshold comprises one of: 1) a packet loss rate at a Packet Data Convergence Protocol (PDCP) layer; 2) a Block Error Rate (BLER) at a Medium Access Control (MAC) layer, 3) Channel State Information Reference Signal Received Power (CSI-RSRP) in a physical layer, or (4) Channel State Information Reference Signal Received Quality (CSI-RSRQ) in the physical layer.

8. The method of claim 1, wherein the information indicating the reception status comprises a Packet Data Convergence Protocol (PDCP) status report.

9. The method of claim 1, wherein the information indicating the reception status comprises a packet loss rate at a Packet Data Convergence Protocol (PDCP) layer.

10. The method of claim 1, wherein the information indicating the reception status comprises a Block Error Rate (BLER) in a Medium Access Control (MAC) layer, a CSI-RSRP in a physical layer, or a CSR-RSRQ in the physical layer.

11. The method of claim 1, wherein the information indicating the reception status is transmitted to the network node using a Radio Resource Control (RRC) signaling message, a Medium Access Control (MAC) Control Element (CE), or a physical layer signaling message.

12. The method of claim 1, wherein each of the one or more radio bearers is associated with a transmission mode, and wherein the information indicating the reception status comprises a mode switching request that requests to switch from the first transmission mode to the second transmission mode for at least one radio bearer that carries the data for the multicast and broadcast service.

13. The method of claim 1 wherein the information indicating the reception status that comprises the mode switching request is of a granularity corresponding to at least one of: (1) each of the one or more radio bearers of the multicast and broadcast service, (2) the multicast and broadcast service, or (3) the communication device.

14. The method of claim 13, further comprising:
receiving, by the communication device, mode switching response information from the network node in response to the mode switching request from the communication device, wherein the mode switching response information is optionally associated with at least one of: (1) an identifier for a radio bearer, (2) an identifier for the multicast and broadcast service.

15. The method of claim 1, wherein the transmission mode comprises a point-to-point transmission mode or a point-to-multipoint transmission mode.

16. The method of claim 1, wherein the network node comprises a central unit (CU) and a distributed unit (DU).

17. A method for wireless communication, comprising:
transmitting, by a network node, configuration information to a communication device that configures information indicating a reception status of a multicast and broadcast service, wherein data for the multicast and broadcast service is carried in one or more bearers; and
receiving, by the network node, the information indicating the reception status from the communication device to trigger a transmission mode switching from a first transmission mode to a second transmission mode different than the first transmission mode for at least one radio bearer that carries the data for the multicast and broadcast service.

18. The method of claim 17, wherein the configuration information comprises an enabling information indicating whether transmitting of the information indicating the reception status is enabled or disabled.

19. The method of claim 17, wherein the information indicating the reception status that comprises the mode switching request is of a granularity corresponding to at least one of: (1) each of the one or more radio bearers of the multicast and broadcast service, (2) the multicast and broadcast service, or (3) the communication device.

20. The method of claim 19, further comprising:
transmitting, by the network node, mode switching response information to the communication device in response to the mode switching request, wherein the mode switching response information is associated with at least one of: (1) an identifier for a radio bearer, (2) an identifier for the multicast and broadcast service.

* * * * *